United States Patent [19]
Fortmann et al.

[11] Patent Number: 5,852,967
[45] Date of Patent: Dec. 29, 1998

[54] FOOD TREATMENT SYSTEM

[75] Inventors: Robert C. Fortmann, Grayslake; Jeffrey S. Erber, Ingleside, both of Ill.; Lawrence G. Banovez, Kenosha, Wis.

[73] Assignee: Restaurant Technology, Inc., Oak Brook, Ill.

[21] Appl. No.: 794,249

[22] Filed: Feb. 3, 1997

[51] Int. Cl.[6] .............................. A47J 39/00; A47J 39/02; A47J 47/14; F25B 29/00
[52] U.S. Cl. .............................. 99/483; 99/448; 99/476; 165/64; 165/918; 312/209; 312/236
[58] Field of Search .............................. 99/372–380, 331, 99/389–391, 422, 426, 427, 448, 467–476, 483; 126/20, 21 A, 369; 165/61, 64, 918, 919, 267; 219/400, 401, 485, 386, 521, 461, 462, 510; 392/399, 394, 403, 405; 312/236, 330.1, 311, 209, 239; 426/510, 511, 523

[56] References Cited

U.S. PATENT DOCUMENTS

| | | |
|---|---|---|
| 3,261,343 | 7/1966 | Tibell . |
| 3,632,968 | 1/1972 | Wilson . |
| 3,674,982 | 7/1972 | Hoyt et al. . |
| 3,897,989 | 8/1975 | Grandi . |
| 3,965,969 | 6/1976 | Williamson . |
| 4,019,022 | 4/1977 | Seider et al. . |
| 4,093,041 | 6/1978 | Davis et al. . |
| 4,103,736 | 8/1978 | Colato et al. . |
| 4,180,125 | 12/1979 | Schulz et al. . |
| 4,194,109 | 3/1980 | Springer . |
| 4,235,282 | 11/1980 | de Fillipis et al. . |
| 4,517,446 | 5/1985 | Torning ..................................... 219/386 |
| 4,584,466 | 4/1986 | de Mola . |
| 4,605,267 | 8/1986 | Rinkewich .............................. 312/236 |
| 4,757,184 | 7/1988 | Swanson et al. . |
| 4,835,368 | 5/1989 | Fortmann et al. ....................... 219/401 |
| 4,891,498 | 1/1990 | Fortmann et al. .......................... 126/20 |
| 4,939,987 | 7/1990 | Smith ......................................... 99/468 |
| 5,025,132 | 6/1991 | Fortmann et al. ................... 392/399 X |
| 5,028,761 | 7/1991 | Oda et al. . |
| 5,069,273 | 12/1991 | O'Hearne . |
| 5,093,556 | 3/1992 | Oelfke . |
| 5,132,520 | 7/1992 | Blanton et al. .......................... 219/400 |
| 5,182,438 | 1/1993 | Oakes et al. . |
| 5,189,281 | 2/1993 | Wyatt et al. . |
| 5,209,941 | 5/1993 | Wuest ..................................... 426/510 |
| 5,285,051 | 2/1994 | DeGrow et al. ........................ 219/386 |
| 5,355,869 | 10/1994 | Pickard et al. . |
| 5,365,039 | 11/1994 | Chaudoir ................................. 99/468 |
| 5,396,046 | 3/1995 | Oelfke . |
| 5,403,997 | 4/1995 | Wimpee et al. . |
| 5,404,945 | 4/1995 | Liebermann . |
| 5,449,232 | 9/1995 | Westbrooks, Jr. et al. ......... 312/236 X |
| 5,454,427 | 10/1995 | Westbrooks, Jr. et al. ......... 165/918 X |
| 5,520,102 | 5/1996 | Monetti ..................................... 99/483 |

*Primary Examiner*—Timothy F. Simone
*Attorney, Agent, or Firm*—Jenner & Block

[57] ABSTRACT

A food treatment system having a frame, a receptacle having a peripheral wall defining a space for storage of a food item and an opening through which a food item can be introduced to the storage space, and a conditioning source for changing the state of fluid in the food treatment space defined by the frame. The frame has a first wall against which the receptacle bears with the receptacle in an operative position with respect to the frame. The frame has a second wall which is spaced from the first wall so that the first and second walls cooperatively define the food treatment space. The second wall at least partially blocks the receptacle opening with the receptacle in the operative position. At least one of the first and second walls is movable relative to the other of the first and second walls to vary the spacing between the first and second walls.

20 Claims, 4 Drawing Sheets

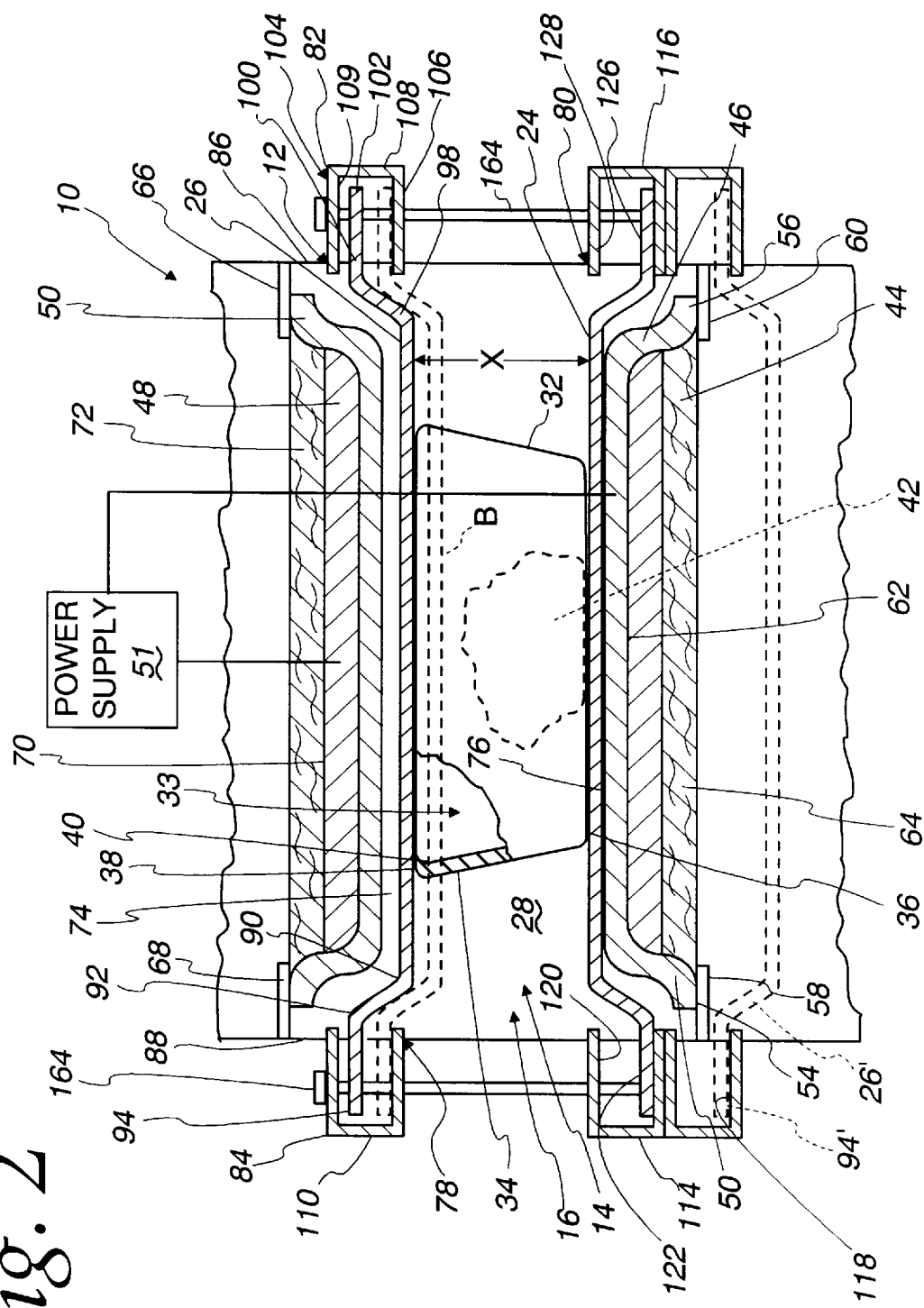

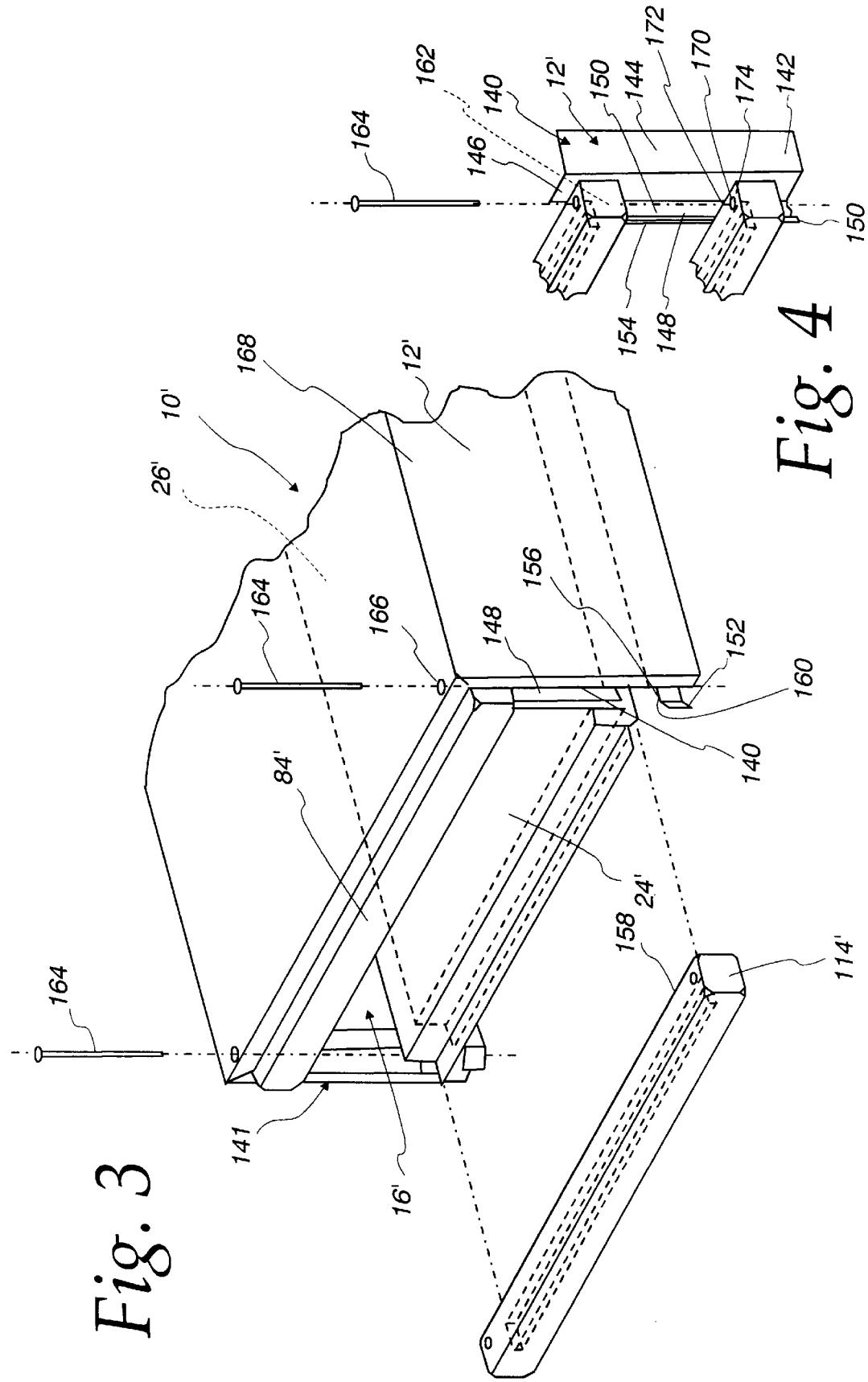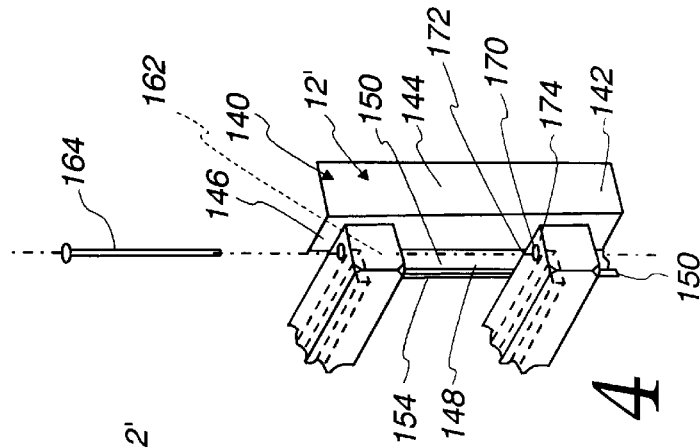

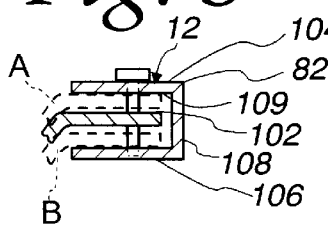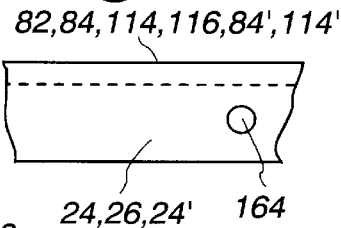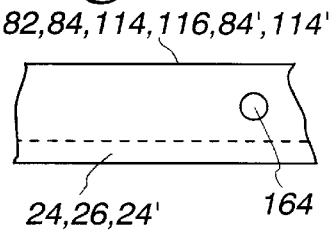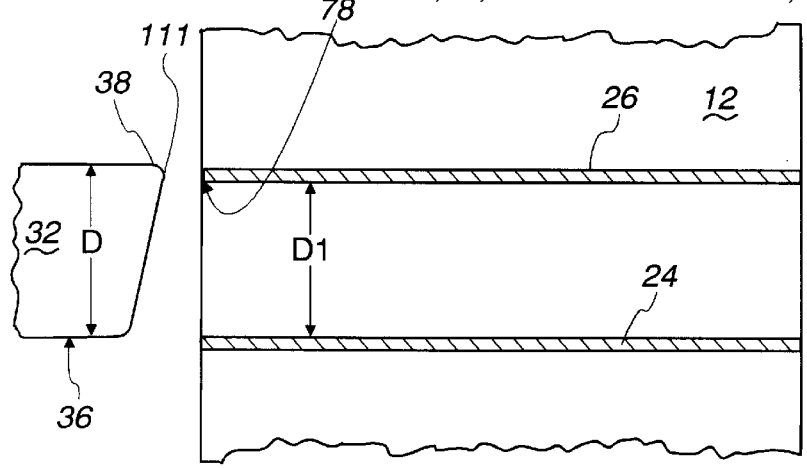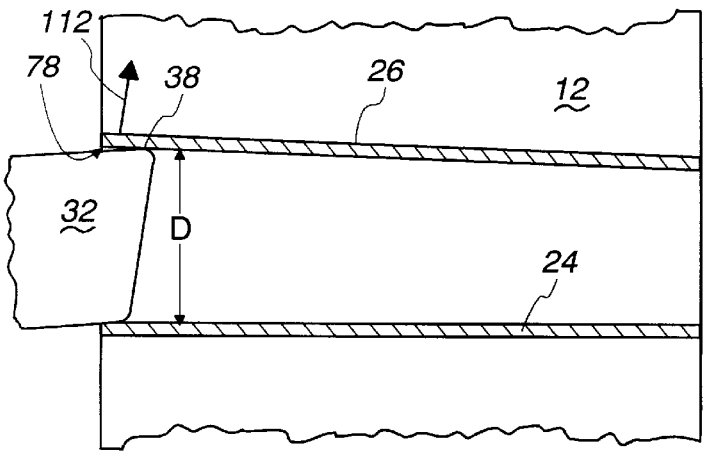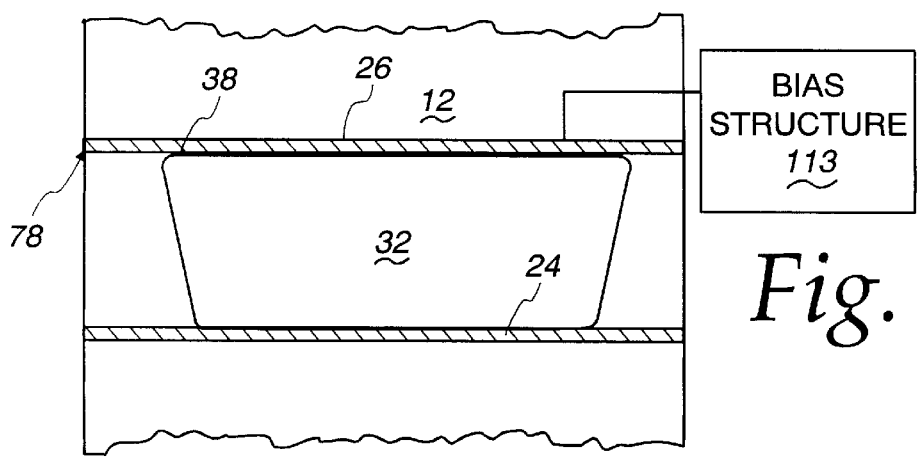

FOOD TREATMENT SYSTEM

BACKGROUND OF THE INVENTION

1. Field of the Invention

This invention relates to a system that defines a conditioned environment, as for treating and/or maintaining the treated state of food items.

2. Background Art

It is the goal of operators of fast food establishments to prepare, and have on hand, food in volumes high enough to promptly accommodate customers during the highest demand hours, yet to minimize waste. These objectives are inherently in competition with each other.

The volume of customers frequenting restaurants cannot be predicted with any certainty. While increase in the volume of customers at peak hours can be anticipated, the volume during these peak hours may vary dramatically from one day to the next, for no apparent reason. For example, large groups often are bussed into fast food restaurants, thereby imposing a severe demand on the food preparers.

To anticipate these unusual demands, fast food owners may keep on hand relatively large quantities of prepared food. A substantial amount of waste inevitably periodically occurs.

The problem of food waste has been significantly diminished by the development of holding cabinets which maintain prepared foods in a cooked and ready-to-eat state for substantial time periods. The assignee herein has made numerous contributions to this technology, among which are those described in U.S. Pat. Nos. 4,835,368 and 4,891,498. These units have been highly commercially successful and have demonstrated an ability to maintain the temperature, appearance, taste, texture and aroma of pre-cooked foods for unusually long periods of time.

In each of the systems in the above two patents, a single "environment" with predetermined humidity and temperature parameters is maintained. The units have been provided with an access door which allows introduction of foods into, and removal of foods from, the food treatment space within the cabinet. Certain of these units are equipped with electronic controls to re-establish the desired environment after the doors open and the environment is disturbed.

It is known to heat vertically spaced shelves to concentrate heat on foods, as shown in U.S. Pat. No. 4,093,041, to Davis et al. It is also known to place food items in a cup-shaped receptacle and to place the receptacle with the food items therein between the heated shelves. This allows the maintenance of separate "environments" in each receptacle.

Ideally, vertically adjacent shelves would be relatively dimensioned so that the lower shelf supports the receptacle and the upper shelf fully blocks/closes the opening to the storage space defined by the receptacle. However, as a practical matter, full closure of the receptacle opening would require that the shelves, receptacle, etc. be manufactured to close tolerances. Even then, bending, warpage, and expansion due to heating in use may alter the fit of the receptacle between the walls.

Even if the close tolerances can be maintained, to fully block the receptacle opening through the upper wall, the receptacle would effectively have to be "squeezed" between the plates. This makes difficult introduction of the receptacle to, and withdrawal of the receptacle from, the food treatment space.

To avoid a situation where the receptacle may bind between the walls, the spacing between the walls can be increased to beyond the corresponding dimension of the receptacle. While this avoids the binding problem, it compromises the blockage of the opening in the receptacle by the upper wall.

SUMMARY OF THE INVENTION

In one form of the invention, a food treatment system is provided having a frame, a receptacle having a peripheral wall defining a space for storage of a food item and an opening through which a food item can be introduced to the storage space, and a conditioning source for changing the state of fluid in the food treatment space defined by the frame. The frame has a first wall against which the receptacle bears with the receptacle in an operative position with respect to the frame. The frame has a second wall which is spaced from the first wall so that the first and second walls cooperatively define the food treatment space. The second wall at least partially blocks the receptacle opening with the receptacle in the operative position. At least one of the first and second walls is movable relative to the other of the first and second walls to vary the spacing between the first and second walls.

In one form, the first and second walls are spaced from each other in a vertical direction.

The at least one of the first and second walls may float on the frame between first and second positions.

The at least one of the first and second walls may be urged under its own weight towards one of the first and second positions.

The at least one of the first and second walls may be guided on the frame between the first and second positions. To accomplish this, a guide post may extend through a part of the at least one of the first and second walls so that the at least one of the first and second walls is slidable guidingly along the guide post between the first and second positions.

In one form, the at least one of the first and second walls in the first position substantially fully blocks the receptacle opening with the receptacle in the operative position.

In one form, the peripheral wall on the receptacle has an edge surrounding the receptacle opening and the at least one of the first and second walls bears on the receptacle edge with the receptacle in the operative position and the at least one of the first and second walls in the first position.

The one of the first and second walls may be normally urged towards one of the first and second positions.

In one form, the frame has an opening for introducing the receptacle to the food treatment space and removing the receptacle from the operative position in the food treatment space. The dimensions of the receptacle are greater than the normal spacing between the first and second walls, requiring that the at least one of the first and second walls be moved away from the other of the first and second positions to allow the receptacle to be directed through the frame opening to the operative position.

In one form, at least one of the first and second walls is separable from the remainder of the frame.

The conditioning source may be a first heater for transferring heat to the first wall and a second heater for transferring heat to the second wall.

With the receptacle in the operative position, one of the first and second walls may be interposed between the first heater and the receptacle.

In one form, the receptacle and the at least one of the first and second walls have cooperating surfaces to produce a camming action to urge the at least one of the first and second walls away from the other of the first and second positions as an incident of the receptacle being introduced to the frame opening and directed toward the operating position.

In another form of the invention, a food treatment system is provided having a frame and first and second walls each having a surface, with the surfaces on the first and second walls bounding a food treatment space, and a conditioning source for changing the state of fluid in the food treatment space. At least one of the first and second walls is movable relative to the other of the first and second walls to selectively vary the spacing between the first and second walls. The frame has an opening to introduce a food item into the food treatment space and withdraw a food item from within the food treatment space.

In one form, the surfaces on the first and second walls are each substantially flat and parallel to each other.

BRIEF DESCRIPTION OF THE DRAWINGS

FIG. 2 is an enlarged, fragmentary, cross-sectional view of the food treatment system taken along line 2—2 of FIG. 1;

FIG. 3 is an exploded, fragmentary, perspective view of a modified form of food treatment system, according to the present invention;

FIG. 4 is an exploded, fragmentary, perspective view of a corner of the food treatment system of FIG. 3;

FIG. 5 is an enlarged, cross-sectional view of a releasable connection between an external visor and an internal wall on the food treatment system taken along line 5—5 of FIG. 1;

FIG. 6 is an enlarged, fragmentary, plan view of one form of connection between the visor of FIG. 5 and one of the walls within the food treatment space in the food treatment system of FIG. 1;

FIG. 7 is a view as in FIG. 6 with a modified form of connection between the visor and wall on the food treatment system of FIG. 1;

FIG. 8 is a schematic, cross-sectional view of the food treatment system as in FIGS. 3 and 4 with a receptacle for a food item being introduced to a food treatment space;

FIG. 9 is a view as in FIG. 8 with the receptacle being further extended into the food treatment space; and FIG. 10 is a view as in FIGS. 7 and 8 with the receptacle directed fully into an operative position within the food treatment space.

DETAILED DESCRIPTION OF THE DRAWINGS

Figure 1:
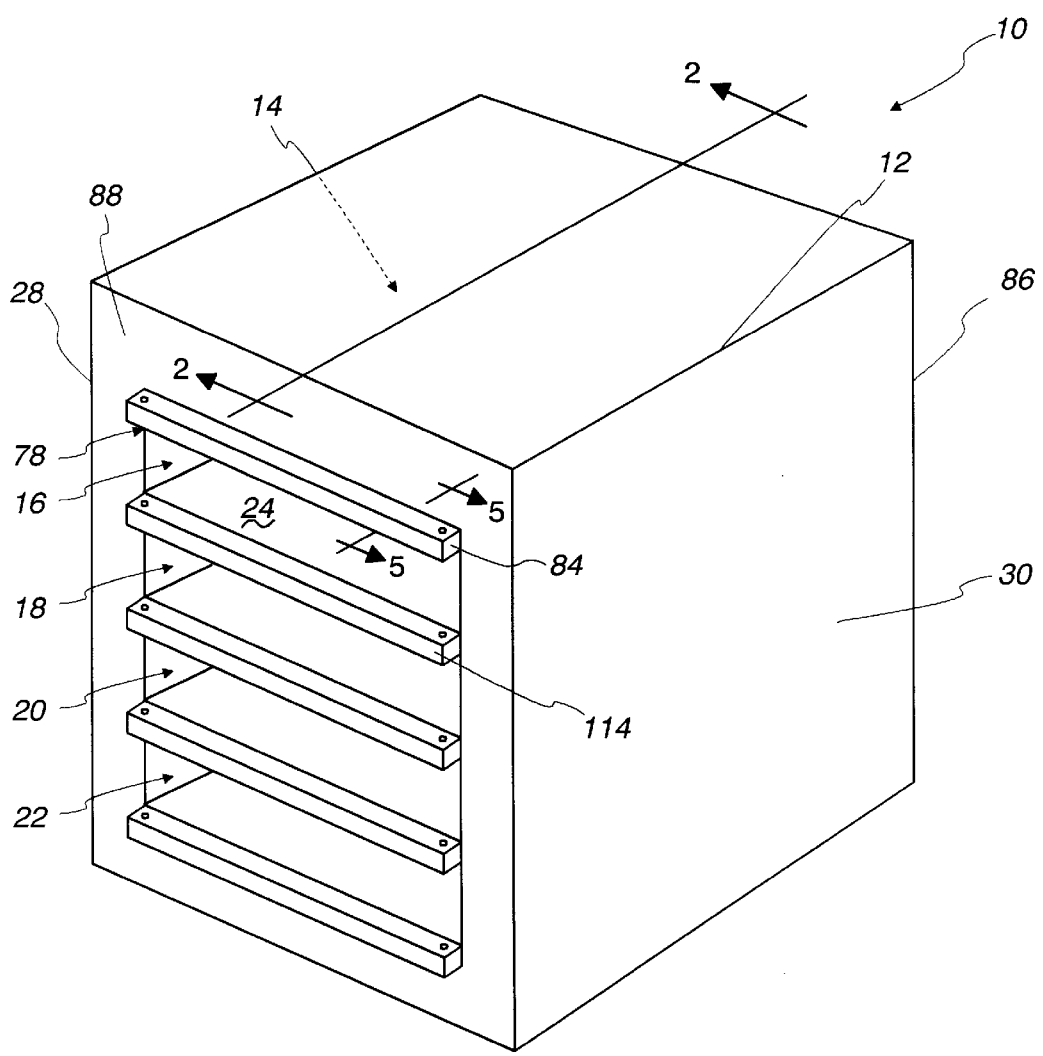
FIG. 1 is a perspective view of a food treatment system, according to the present invention.

In FIGS. 1, 2 and 5, one form of food treatment system, according to the present invention, is shown at 10. The food treatment system 10 consists of a frame 12, which has a generally cubical outer configuration. The frame 12 bounds an internal food treatment region 14, which in this case is divided into four separate food treatment spaces 16, 18, 20, 22, which are in vertically spaced relationship. The number of food treatment spaces 16–22, contemplated by the invention, is a matter of design choice. The invention further contemplates a system having only a single food treatment space.

The food treatment space 16 will be described in detail as representative of the other food treatment spaces 18, 20, 22. The food treatment space 16 has a bottom wall 24 and a top wall 26 which define vertical boundaries of the food treatment space 16. The frame 12 includes spaced side walls 28, 30, which bound and determine the lateral dimension of the food treatment space 16.

The walls 24, 26 are designed to cooperate with a receptacle 32 to produce a substantially closed environment within a storage space 33 defined by the receptacle. The receptacle 32 has a peripheral wall 34 and a bottom wall 36 which bound the storage space 33. The peripheral wall 34 has an upper edge 38 which extends around an opening 40 through which a food item 42 can be introduced to the receptacle space 33.

In FIG. 2, the receptacle 32 is shown in an operative position within the food treatment space 16. In this position, the bottom wall 36 of the receptacle 32 bears upon the frame bottom wall 24. The top wall 26 bears upon the upper edge 38 of the receptacle 32 to thereby fully block the receptacle opening 40 so as to create a closed environment within the receptacle storage space 33.

It is contemplated that the space 16 be conditioned with the food item 42 in the receptacle 32 maintained in this conditioned environment with the receptacle in the operative position of FIG. 2. In a preferred form, the conditioning source is a heater 44, which conducts heat through a heat sink 46 to the bottom wall 24, and a separate heater 48 which conducts heat through a heat sink 50 to the top wall 26. The heaters 44, 48 may be conventional silicon pad heaters operated through a conventional power supply 51.

In the embodiment shown, the heat sink 46 has a cup-shaped body 52 with spaced, outturned support flanges 54, 56. The flanges 54, 56 rest upon frame brackets 58, 60, respectively. The body configuration defines a cup-shaped space 62 within which the heater 44 nests. An insulation layer 64 fills the space 62 beneath the heater 44. The heat sink 50 has generally the same configuration as the heat sink 46 and is inverted to be suspended from frame brackets 66, 68. The heater 48 is nested in a space 70 defined by the heat sink 50 and covered by an insulation layer 72.

A gap 74 is preferably maintained between the heat sink 50 and the upper wall 26. This minimizes warpage of the upper wall 26 so that the upper wall 26 can maintain a substantially flat shape to closely conform to flat upper edges of receptacles which it overlies. The problem of warpage is not as prevalent with the bottom wall 24, which conforms to and is supported by the heat sink 46. The weight of the receptacle 32 bears the wall 24 against the conforming, flat, upwardly facing surface 76 of the heat sink 46.

The invention facilitates the introduction of the receptacle 32 into the food treatment space 16. Introduction to the treatment space 16 can be made through either a front opening 78 in the frame 12 or a rear opening 80 in the frame 12. The front and rear designations are arbitrary since the pass through design is preferably made to be symmetrical about a vertical plane located mid-way between the front and rear of the frame 12.

According to the invention, the top wall 26 is movable relative to the bottom wall 24 to thereby vary the captive space X between the flat, facing surfaces of the walls 24, 26. Making the top wall 26 movable allows the space 16 to accommodate receptacles 32 of slightly different dimension. Also, by allowing the wall 26 to move, the wall 26 will move upwardly to accept the receptacle 32 without significant resistance. By using a floating mount for the wall 26, the wall 26 will be cammed upwardly by the incoming receptacle 32 and then be urged downwardly under its own weight into a blocking relationship over and against the upper edge 38 of the receptacle 32 as the receptacle 32 realizes the operative position.

To make this floating mount, visors 82, 84 are employed. The visors 82, 84 perform a mounting function and also retard the flow of heat outwardly through the openings 78, 80, as described more fully in application Ser. No. 08/561,438, which is now pending and assigned to the assignee hereof. Each visor 82, 84 has a generally U-shaped cross section. The visor 82 is attached to the rear frame wall 86, with the visor 88 attached to the frame front wall 88 in a manner described in more detail with respect to the embodiment shown in FIGS. 3 and 4. The visors 82, 84 span the full lateral extent of the openings 80, 78, respectively.

The top wall 26 has a bend at 90, which blends forwardly into a vertically extending portion 92 and a forwardly projecting flange 94 at the front wall 88. The rear end of the wall 96 has a like bend 98, a vertically extending portion 100, and a rearwardly projecting flange 102. The flanges 94, 102 project forwardly and rearwardly, respectively, beyond the front wall 88 and the rear wall 86. Both flanges 94, 102 cooperate with their respective visor 84, 82 in the same fashion and this cooperative relationship will be described with respect to the exemplary visor 82, as seen clearly in FIGS. 2 and 5.

The visor 82 has a top wall 104, a bottom wall 106 and a rear wall 108 which cooperatively bound a space 109 within which the flange 102 is allowed to floatingly move between a) a fully raised position, as shown in phantom at A in FIG. 5, wherein the flange 102 abuts to the upper wall 104 of the visor 82, and b) a fully lowered position, as shown in phantom at B in FIG. 5, wherein the flange 102 abuts to the bottom wall 106 of the visor 82. The spacing between the rear wall 108 on the visor 82 and the corresponding front wall 110 on the visor 84 is chosen so that the flanges 94, 102 are captive between the walls 108, 110, but do not bind therewith as the top wall 26 shifts between the A and B positions. The top wall 26 shifts under its own weight to normally assume the B position.

The general operation of the system 10, as described above, is shown schematically in FIGS. 8–10. The receptacle 32 is preferably made with a vertical dimension D, between the bottom wall 36 and upper edge 38, that is greater than the dimension D1 between the facing surfaces of the walls 24, 26. As a result, the receptacle 32 must be "squeezed" between the walls 24, 26 to assume the operative position of FIG. 10. The leading portion 111 of the receptacle 32 initially cams the top wall 26 upwardly in the direction of the arrow 112 as the receptacle 32 is moved from the FIG. 8 position and projected through the opening 78. Initially the front portion of the wall 26 tips, with the rear flange 102 remaining in the lowered B position against the visor wall 106. As the receptacle 32 moves fully into the operative position of FIG. 10, the wall 26 becomes entirely supported upon the upper edge 38 of the receptacle 32 so as to fully block the opening 40.

A seal is effected by the wall 26 which is urged under its own weight into conformance to the upper edge 38. A bias structure 113 could be incorporated to enhance the sealing effect by exerting a downward force on the wall 26. The bias force is preferably sufficient to enhance the seal without creating too much interference to introduction of the receptacle 32 into the space 16 and removal of the receptacle 32 from the space 16.

A visor 114 is provided at the front of the system 10 above the space 16, with a similarly configured visor 116 being provided at the same vertical location at the rear of the system 10. The visors 114, 116, are substantially the same. The exemplary visor 114 has the shape of an "E" in cross section with a lower space 118 to accommodate the flange 94' on a wall 26' which bounds the underlying food treatment space 18 and functions in the same manner as the wall 26. The visor 114 defines an upper space 120 to accommodate a downwardly offset, forwardly projecting flange 122 on the bottom wall 24. A rear flange 126 on the wall 24 is accommodated by a space 128 on the visor 116 that is similar to the space 120. The spaces 120, 128 can be dimensioned to closely accept the flanges 122, 126 or can be made significantly larger in vertical dimension to allow the bottom wall 24 to likewise float in a vertical direction, which facilitates assembly and disassembly thereof.

While the invention contemplates that the visors 82, 84, 114, 116 could be permanently attached, more preferably, as shown in FIGS. 3, 4, 6 and 7, the visors 82, 84, 114, 116 are made removable, which in turn allows the walls 24, 26 to be separated from the visors 82, 84, 114, 116 and the rest of the frame 12, as to facilitate cleaning and repair.

This removable arrangement is shown on a food treatment system 10' that has but a single food treatment space 16'. The configuration of the food treatment system 10' is the same as that 10, previously described, with the only significant difference being that there is one treatment space 16, as opposed to the vertically stacked treatment spaces 16, 18, 20, 22 in the system 10.

The frame 12' includes four corner supports 140, 141 (two shown). All the corner supports 140, 141 are structurally and functionally the same. Exemplary corner support 140 will be described below in relationship to upper and lower visors 84', 114', corresponding to the visors 84, 114, previously discussed.

The corner support 140 has a vertical angle element 142 with orthogonal side and front surfaces 144, 146, respectively. A spacing/support wall 148 has a forwardly projecting portion 150 and a free end portion 152 which projects angularly away from the forwardly projecting portion 150. The spacing/support wall 148 produces a contoured surface 154 which guides a receptacle 32 into the space 16'.

The spacing/support wall 148 has a lower cutout 156 with a vertical dimension equal to that of the visor 114'. The end 158 of the visor 114' fits within the cutout 156 to be supported by an upwardly facing edge 160 bounding the cutout 156. In a filly assembled position, the visor 114' abuts to the front surface 146 of the angle element 142. The upper visor 84' rests on the upper edge 162 of the angle element 142.

To maintain the visors 84', 114' in place, removable pins/posts 164 are used. Each pin/post 164 projects through an opening 166 in a protective cover layer 168 on the frame 12' and through each of the visors 84', 114'. To reinforce the bottom visor connection, an L-shaped reinforcing tab 170 is used with a vertical leg 172 rigidly attached to the forwardly projecting portion 150 of the angle element 142 and a horizontal leg 174 situated to closely overlie the visor 114'. The pin/post 164 projects through the tab leg 174 and through the underlying visor 114'.

With this arrangement, by extracting four pins/posts 164, the visors 84', 114' can be separated from the remainder of the frame 12' and the plates 24', 26', which facilitates release of the plates 24', 26', that are configured the same as the plates 24, 26, previously described. This operation can be performed without tools in the embodiment shown and allows the separated plates 24', 26' to be handled easily, as to facilitate cleaning and repair.

This same arrangement of pins/posts 164 is used on the system 10, as shown clearly in FIG. 2, wherein the pins/posts 164 project through the upper visors 82, 84 and into the lower visors 114, 116 in a similar fashion.

The walls 24, 26, 24' can project sufficiently into the visors 82, 84, 114, 116, 84', 114' to be penetrated by the pins/posts 164, as shown in FIG. 6. Alternatively, as shown in FIG. 7, the walls 24, 26, 24' may have a lesser extent in a fore and aft direction so that the pins/posts 164 do not project therethrough. With the FIG. 6 arrangement, the walls 24, 26, 24' are slidable guidingly along the posts 164 between the raised (A) and lowered (B) positions.

The walls 24, 26, 24' are preferably made from stainless steel. However, they can be made from other materials, such as aluminum, and would function in comparable fashion. The visors 82, 84, 114, 116, 84', 114' are preferably made from a plastic material, that will provide a cushioning effect, i.e. function as a bumper, and will remain relatively cool to the touch in use. One suitable material is DELRIN™ plastic.

The foregoing disclosure of specific embodiments is intended to be illustrative of the broad concepts comprehended by the invention.

We claim:

1. A food treatment system comprising:

a frame;

a receptacle having a peripheral wall defining a space for storage of a food item and an opening through which a food item can be introduced to the storage space, the frame comprising a first wall against which the receptacle bears with the receptacle in an operative position with respect to the frame, the frame comprising a second wall which is spaced from the first wall so as to define a food treatment space between the first and second walls, the second wall at least partially blocking the receptacle opening with the receptacle in the operative position, wherein at least one of the first and second walls is movable relative to the other of the first and second walls to vary the spacing between the first and second walls; and a conditioning source for changing the state of a fluid in the food treatment space.

2. The food treatment system according to claim 1 wherein the frame has a top and bottom and the first and second walls are spaced from each other in a vertical direction.

3. The food treatment system according to claim 1 wherein the at least one of the first and second walls floats on the frame between first and second positions.

4. The food treatment system according to claim 3 wherein the at least one of the first and second walls is urged under its weight towards one of the first and second positions.

5. The food treatment system according to claim 4 wherein the at least one of the first and second walls is guided on the frame in movement between the first and second positions.

6. The food treatment system according to claim 1 wherein the at least one of the first and second walls is movable between first and second positions, and the at least one of the first and second walls in the first position substantially fully blocks the receptacle opening with the receptacle in the operative position.

7. The food treatment system according to claim 6 wherein the peripheral wall on the receptacle has an edge surrounding the receptacle opening and the at least one of the first and second walls bears on the receptacle edge with the receptacle in the operative position and the at least one of the first and second walls in the first position.

8. The food treatment system according to claim 3 wherein the at least one of the first and second walls is normally urged towards one of the first and second positions to assume a normal spacing with the other of the first and second walls, the frame has an opening for selectively introducing the receptacle to the food treatment space into the operative position and removing the receptacle from the operative position in the food treatment space, the dimension of the receptacle is greater than the normal spacing between the first and second walls requiring that the at least one of the first and second walls be moved away from the other of the first and second positions to allow the receptacle to be directed through the frame opening to the operative position.

9. The food treatment system according to claim 1 wherein at least one of the first and second walls is separable from the remainder of the frame.

10. The food treatment system according to claim 1 wherein the conditioning source comprises a first heater for transferring heat to the first wall and a second heater for transferring heat to the second wall.

11. The food treatment system according to claim 10 wherein with the receptacle in the operative position, one of the first and second walls is interposed between the first heater and the receptacle.

12. The food treatment system according to claim 5 wherein there is a guide post extending through a part of the one of the first and second walls and the one of the first and second walls is slidable guidingly along the guide post between the first and second positions.

13. The food treatment system according to claim 8 wherein the receptacle and the at least one of the first and second walls have cooperating surfaces which produce a camming action to urge the at least one of the first and second walls away from the other of the first and second positions as an incident of the receptacle being introduced to the frame opening and directed toward the operative positions.

14. A food treatment system comprising:

a frame comprising first and second walls each having a surface with the surfaces on the first and second walls bounding a food treatment space, at least one of the first and second walls being movable relative to the other of the first and second walls to selectively vary the spacing between the first and second walls, said frame having an opening to allow introduction of a food item into the food treatment space and withdrawal of a food item from within the food treatment space; and a conditioning source for changing the state of a fluid in the food treatment space.

15. The food treatment system according to claim 14 wherein the one of the first and second walls floats on the frame between first and second positions.

16. The food treatment system according to claim 14 wherein the surfaces on the first and second walls are each substantially flat and parallel to each other.

17. The food treatment system according to claim 14 wherein the frame has a top and bottom and the first and second walls are spaced from each other in a vertical direction.

18. The food treatment system according to claim 14 wherein the at least one of the first and second walls is normally urged towards one of the first and second positions.

19. The food treatment system according to claim 14 wherein the frame comprises a guide post and the one of the first and second walls is guided by the guide post between the first and second positions.

20. The food treatment system according to claim 14 in combination with a receptacle having a peripheral wall defining a space for storage of a food item and an opening through which a food item can be introduced to the storage space, said receptacle being placeable in an operative position within the food treatment space wherein one of the first and second walls overlies and at least partially blocks the receptacle opening.

* * * * *